United States Patent [19]

Gerstmann et al.

[11] Patent Number: 4,798,240

[45] Date of Patent: Jan. 17, 1989

[54] INTEGRATED SPACE HEATING, AIR CONDITIONING AND POTABLE WATER HEATING APPLIANCE

[75] Inventors: Joseph Gerstmann, Framingham; George M. Celorier, Jr., Milford; Wayne S. Hill, Boston, all of Mass.

[73] Assignee: Gas Research Institute, Chicago, Ill.

[21] Appl. No.: 712,863

[22] Filed: Mar. 18, 1985

[51] Int. Cl.[4] .......................................... F25B 29/00
[52] U.S. Cl. ................................. 165/48.1; 165/58; 165/913; 62/238.6; 237/19; 122/20 A; 122/20 B; 122/169
[58] Field of Search ................ 165/58, 59, 40, 48.1, 165/913; 62/238.6, 238.7; 237/19; 122/20 A, 20 B, 169

[56] References Cited

U.S. PATENT DOCUMENTS

| | | | |
|---|---|---|---|
| 2,632,306 | 3/1953 | Ruff | 62/238.6 |
| 2,696,085 | 12/1954 | Ruff | 165/51 |
| 2,739,452 | 3/1956 | Dodge | 62/238.6 |
| 2,795,938 | 6/1957 | Galazzi | 165/58 |
| 3,301,002 | 1/1967 | McGrath | 62/238.6 |
| 3,653,431 | 4/1972 | Loveley | 165/58 |
| 3,896,992 | 7/1975 | Borovina et al. | |
| 4,125,151 | 11/1978 | Hays et al. | 165/58 |
| 4,134,448 | 1/1979 | Luksus | 237/19 |
| 4,149,673 | 4/1979 | Hapgood | |
| 4,158,386 | 6/1979 | Hapgood | |
| 4,158,438 | 6/1979 | Hapgood | |
| 4,178,907 | 12/1979 | Sweat, Jr. | |
| 4,199,955 | 4/1980 | Jonsson | |
| 4,222,350 | 9/1980 | Pompei et al. | |
| 4,226,606 | 10/1980 | Yaeger et al. | |
| 4,281,519 | 8/1981 | Spath et al. | 237/19 |
| 4,399,664 | 8/1983 | Derosier | 62/238.6 |
| 4,401,058 | 8/1983 | Charrier et al. | |
| 4,403,572 | 9/1983 | Gerstmann et al. | |
| 4,514,990 | 5/1985 | Sulkowski | 62/238.7 |

FOREIGN PATENT DOCUMENTS

| | | | |
|---|---|---|---|
| 0060338 | 9/1982 | European Pat. Off. | 237/19 |
| 2519796 | 11/1975 | Fed. Rep. of Germany | 237/19 |
| 468262 | 7/1914 | France | 165/40 |

OTHER PUBLICATIONS

"Magic-Pak Thru-The-Wall Combination Heating-/Cooling Product Specifications," Publication No. MP-2, 1/84.

Primary Examiner—Albert W. Davis, Jr.
Assistant Examiner—John K. Ford
Attorney, Agent, or Firm—Hamilton, Brook, Smith & Reynolds

[57] ABSTRACT

Space heating and cooling and potable water heating are provided by a single appliance. The housing appliance is divided into four sections: a lower water storage section, a middle hardware section, an upper internal air handling section and a side external air handling section which may protrude through a building wall. A heating medium from a single burner heat exchanger may be directed to either a liquid to air heat exchanger for space heating or to a hot water storage tank for heating potable water. The storage tank contains a heat exchanger for heat transfer from the heating medium to the potable water. A single thermostatic flow control maintains a constant temperature of heating medium directed to either the liquid to air heat exchanger or the storage tank to provide condensation of products of combustion during the space heating mode of operation and part of the water heating mode of operation and yet preclude overheating of the heating medium. As a result of the thermostatic flow control, a low flow rate for higher efficiency is feasible and the flow rate may be varied with changes in the temperature of the stored water. For added efficiency, refrigerant from the air conditioner compressor may pass in heat exchange relationship with the stored water to recover heat of compression by the stored water.

17 Claims, 6 Drawing Sheets

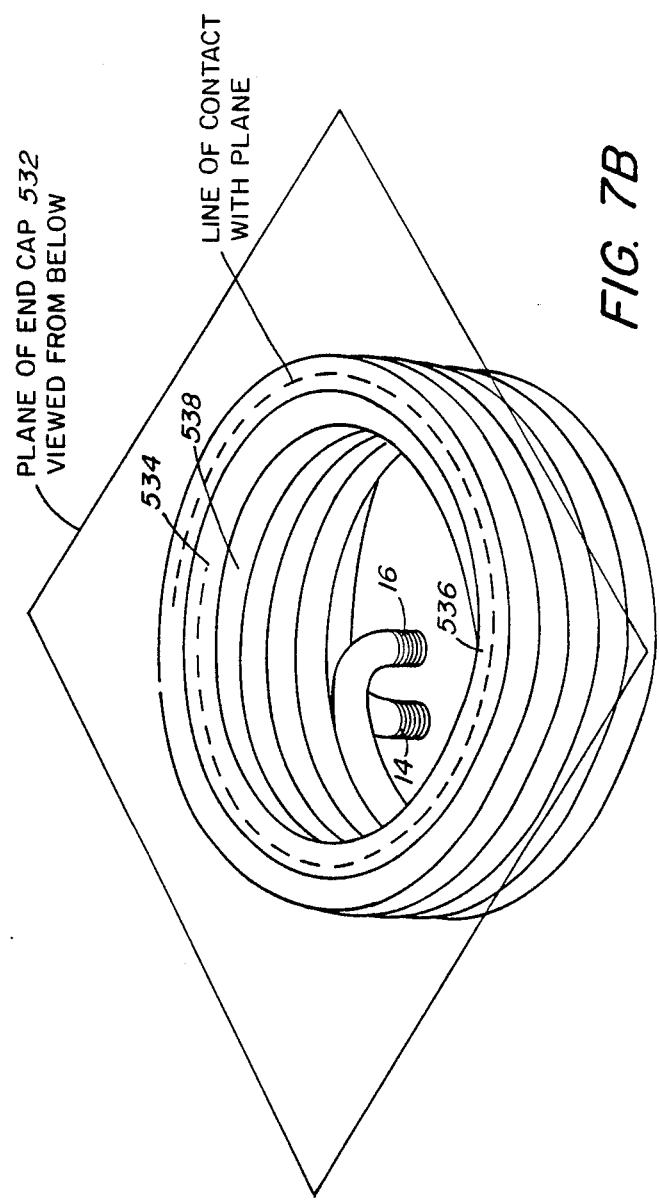

4,798,240

INTEGRATED SPACE HEATING, AIR CONDITIONING AND POTABLE WATER HEATING APPLIANCE

DESCRIPTION

BACKGROUND OF THE INVENTION

Most multifamily housing units are either heated from a central source such as a central boiler or are heated from one or more sources in each dwelling unit. In the latter case, the heat source may consist of a gas or oil furnace, an electric heat pump, or electric resistance heating units. Currently, most multifamily dwelling units are air-conditioned, either from a central chilled water source, by individual through-the-wall or window air conditioners, or by the use of an individual heat/cool heat pump within each dwelling unit. Domestic hot water is commonly supplied from a central source, although in some cases each dwelling unit will have an individual electric or gas water heater.

Experience has shown that when the tenant pays for the utilities, there is a significant reduction in energy consumption. For this reason, and in order to shield themselves from energy rate increases that they cannot pass off to the tenants, many building owners would prefer that tenants pay for their own utilities. While this may be reasonably straightforward in the case of electricity, it is not so straightforward in the case of gas heat and hot water. In buildings with central boilers, there are technical and legal obstacles to metering and charging tenants for the hot water they use. The problems associated with venting flue products and the space requirements of separate furnaces and gas water heaters makes individual space and water heating impractical for many dwelling units. Although many dwelling units have individual electric submetering, and while individual electric air conditioning is a viable option, electric heating via heat pumps or resistance heating is more expensive than gas heating in most areas of the country.

Space requirements are extremely important in multifamily housing. The typical multifamily dwelling unit is significantly smaller than a single-family dwelling unit. From the developer's standpoint, a high value is placed on usable space, so appliances which require a minimum of floor space may command a premium.

Therefore, a need exists for an integrated appliance which combines space heating and cooling and potable water heating in a single compact package, and which provides these functions with a minimum operating cost. With current technologies and energy costs, the most economical method of providing these functions is to utilize electric air conditioning and gas space heating and potable water heating.

DISCLOSURE OF THE INVENTION

In an integrated water and space heating and space cooling appliance a heating medium is heated by a single burner and transfers heat to either a liquid to air heat exchanger for space heating or a water storage tank for heating potable water by neat exchange. The appliance housing has a lower water storage section, a middle hardware section and an upper internal air handling section in an internal portion. A side external air handling section extends from the internal portion of the housing to pass through a building wall. An insulated hot water storage tank is positioned in the lower section of the housing. The storage tank contains a heat exchanger for transfering heat from the heating medium to potable water. A burner and a burner heat exchanger for heating the heating medium are positioned in the middle section. The liquid to air heat exchanger is in the upper section. An air conditioner includes a compressor in the middle section, an evaporator in the upper section and a condenser in the side section. A blower in the upper section blows air for space heating past the liquid to air heat exchanger and the evaporator for heating the air by the heat exchanger or cooling the air by the evaporator. A blower in the side section blows external air past the condenser of the air conditioner.

A common pump forces heating medium from the liquid to air heat exchanger and the storage tank through the burner heat exchanger. Flow control means is provided for varying the flow of the heating medium through the burner heat exchanger to maintain a steady temperature of heating medium from the burner heat exchanger in both space heating and water heating modes of operation. The heating medium from the burner heat exchanger may, for example, be maintained at about 180° F. The liquid to air heat exchanger circuit is designed such that, in the space heating mode of operation, the temperature of the heat transfer fluid drops to a low level such as about 110° F. which results in condensation of vapor in the products of combustion for greater system efficiency. The thermostatic flow control means allows for that efficient return temperature of the heating medium without the risk of overheating the liquid in the burner heat exchanger. In the water heating mode of operation, the thermostatic flow control allows for the optimum temperature of about 180° even as the temperature in the water storage tank varies. In a preferred system, the heating medium flows at a rate of about 1.3 gallons per minute in the space heating mode of operation, and the flow varies from about 1 gallon per minute to about 4.3 gallons per minute in the water heating mode of operation as the stored water temperature increases.

In one preferred system, the heat exchanger is formed of a single tube wound in one axial direction to form an inner heat exchanger section, along a transition to an outer heat exchanger section and in a reverse axial direction to form the outer heat exchanger section. The transition is formed with a varying radius in a single plane of an end cap and the first portion of the first turn of the second heat exchanger section lies in the same plane such that the transition and first turn together form a 360° section of tubing lying in the single plane of the end cap.

Another preferred heat exchanger is formed of a single tube formed into inner and outer heat exchanger sections, each section formed of axially spaced planar turns. A transition between each turn provides an axial displacement of successive turns and a transition between the inner and outer sections provides both axial and radial displacement between the sections. The turns of the outer section are in parallel planes staggered relative to parallel planes of the turns of the inner section.

Preferably, the burner heat exchanger is formed of a single coil formed into distinct primary and economizer heat exchanger sections.

For further increased efficiency, superheated compressed refrigerant in the air conditioning system may be carried into heat exchange relationship with the stored hot water to capture some of the waste heat of the air conditioning system in the stored hot water.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 7a and 7b illustrate yet another configuration of burner heat exchanger similar to that of FIG. 6 but allowing for a flat bottom insulator;

DESCRIPTION OF A PREFERRED EMBODIMENT

Figure 1:
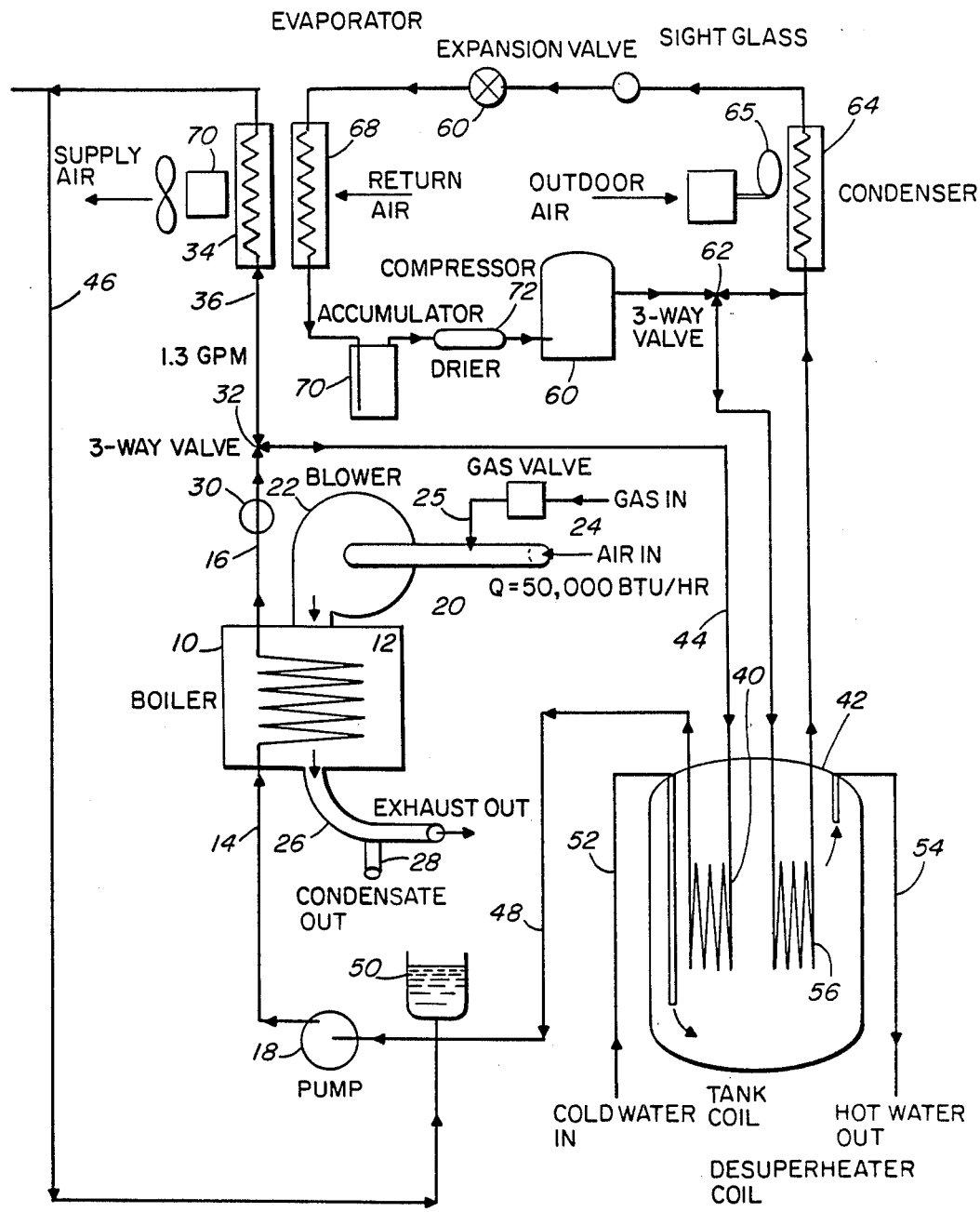
FIG. 1 is a schematic flow diagram of a system embodying the present invention.

An integrated appliance embodying the present invention is shown schematically in FIG. 1. A heating medium, typically water, is heated in boiler 10 and serves as a heat transfer fluid. The term boiler is typically used even though boiling of the heating medium is actually avoided. The water may be mixed with an antifreeze such as glycol. The boiler 10 contains a heat exchanger coil 12 connected to a return pipe 14 and a supply pipe 16. The heating medium is circulated by a pump 18 which is driven by an electric motor (not shown). Combustion air is drawn into an induction tube 20 by a combustion blower 22. Gas supplied by a gas valve 24 is mixed with combustion air in the induction tube 20. The mixture is forced by a blower 22 into a combustion chamber (not shown) located within the boiler 10. After exchanging heat with the heat exchanger 12, the cooled products of combustion exit from the boiler through an exhaust pipe 26, which includes a condensate drain 28.

Heated fluid flows from the boiler 10 through supply pipe 16 and through thermostatic flow control valve 30 to 3-way valve 32. The function of thermostatic control valve 30 is to control the flow of heating medium so as to maintain a reasonably fixed supply temperature, typically 180° F. This temperature is selected to give sufficient temperature difference for effective heat transfer in the components to be heated by the heating medium, while not so hot as to permit boiling to occur within the boiler 10. The three-way valve 32 directs heating medium either to an air coil 34 through an air coil supply pipe 36 or to a domestic hot water immersion coil 40 located within a domestic hot water storage tank 42 via a domestic hot water supply pipe 44. The heating medium returns to the circulating pump 18 either through an air coil return pipe 46 or a domestic hot water return pipe 48. An atmospheric reservoir 50 contains a reserve supply of heating medium so that the medium can expand as it is heated. As the reservoir is exposed to atmosphere, there is no danger of overpressuring the boiler 10, and no safety relief valve is required. Alternately, a closed expansion tank, preferably of the diaphragm type, may be used in place of the atmospheric reservoir, such that the pressure of this heating medium may be maintained between 10 psig to about 30 psig.

By controlling the flow of heating medium with thermostatic flow control valve 30, and by designing air coil 34 to cool heating medium by a certain degree, the return temperature to boiler 10 is controlled to be below the dew point temperature of the water vapor in the products of combustion from the burner, thus permitting the heat exchanger 12 to operate in the condensing mode. Condensing the water vapor extracts more energy from the products of combustion by extracting the latent heat of evaporation. The same thermostatic valve 30 is used to control the temperature to the immersion coil 40 in the domestic hot water tank 42. Again, by suitable design of the immersion coil, the return temperature to the boiler can be kept below the dew point temperature for most of the recovery cycle of the potable water heater. Without the thermostatic control valve 30, a higher flow rate would have to be maintained through both the air coil 34 and the immersion coil 40 in order to assure that the heating medium did not reach an excessive temperature. Such a high flow rate would cause the return temperature to the boiler to be higher, thereby diminishing the condensing potential. Additionally, the higher flow rate would require a larger, more powerful circulating pump 18, and larger, more expensive fluid conduits 12, 16, 36, 46, 44, 40, 48, and 3-way valve 32.

Typically, to obtain condensation the flue gases must be reduced to less than about 130° F., and to that end the return heating medium must have a low temperature of about 110° F. To obtain that low temperature of the return heating medium while transferring a given amount of heat from the burner to the heated air or stored water, the flow rate should be relatively low and the temperature of the heating medium from the boiler heat exchanger should be relatively high, about 180° F. In a fixed flow rate system, there would be the danger of the temperature of the heating medium exceeding 180° and resulting in boiling of the heating medium. With the present system, the desired temperatures for efficient operation of the system are obtained without the danger of overheating of the heating medium by providing the thermostatic flow control. If the temperature of the heating fluid should increase above 180° F., the fluid flow is increased to reduce that temperature.

In the water heating mode of operation, when the water in the storage tank is cool, condensation of the products of combustion can be obtained with sufficiently low flow rate of the heating medium. However, with higher temperatures of the stored water, condensation cannot be obtained and higher flow rates must be used to prevent overheating of the heating medium. Thus, the thermostatic flow control allows for varying of the flow rate as a function of the temperature of the stored water to maintain a high temperature of the heating medium of about 180° F. without overheating of that medium. Thus, in the space heating mode of operations a constant flow rate of about 1.3 gallons per minute might be used; whereas in a water heating mode the flow rate might increase from about 1 gallon per minute to about 4.3 gallons per minute through a heating cycle.

The domestic hot water storage tank 42 contains a cold water inlet 52 and a hot water outlet 54. Optionally, the domestic hot water tank may also contain desuperheater coil 56 which receives superheated vapor from the air-conditioning system to heat water in the tank when the air conditioner is in operation.

The air conditioner consists of a compressor 60 connected to a 3-way valve 62 which directs compressed vapor either to the desuperheater coil 56 or directly to a condenser 64. The vapor is cooled in the condenser 64 by outside air drawn past the condenser by a blower 65. Condensate from the condenser 64 is conveyed to an expansion valve 66 and then to an evaporator 68 where the low temperature liquid refrigerant is evaporated. Vapor from the evaporator 68 then flows through an accumulator 71 and dryer 72 back to compressor 60. Return air from the conditioned space is drawn through the air-side passages of the evaporator 68 and the air coil 34 in series by blower 70, which discharges the conditioned air to the conditioned space.

By integrating the air coil 34 and the evaporator coil 68, both the space heater and the space cooler are able to use the same blower 70. Likewise, by packaging the air-conditioning compressor and condenser with the heating boiler, the domestic water heater can take advantage of "free heat" when the air conditioner is in operation, thus reducing the amount of gas consumed for domestic water heating. By integrating the domestic water heater with the space heater, a single burner/boiler can be utilized to heat both systems, with a resultant savings in first cost and space requirements. The use of a single burner/boiler is facilitated by the use of the heating medium which alternatively passes through a liquid to air heat exchanger or a liquid to liquid heat exchanger.

Figure 2:
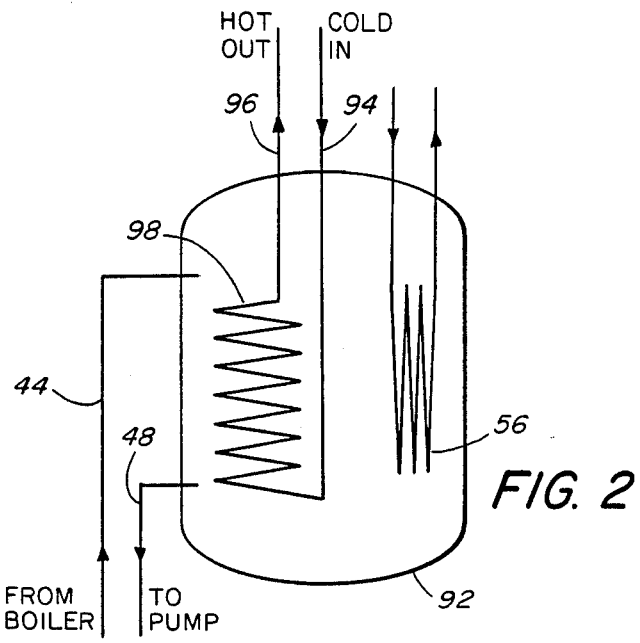
FIG. 2 is a schematic illustration of an alternative arrangement of the water storage tank.

An alternative to the domestic hot water storage tank 42 of FIG. 1 is shown in FIG. 2. An insulated storage tank 92 is connected to a circulating pump 18 via fluid conduit 48 and to boiler 10 (through 3-way valve 32) via fluid conduit 44. The fluid heating medium, which may be water, is maintained at an elevated temperature within the tank 92 by being circulated by the pump 18 and heated by the boiler 10. The tank 92 contains an immersion heat exchanger 98, which receives cold water via a fluid conduit 94, and discharges water heated by the stored fluid heating medium via a fluid outlet conduit 96. The tank 92 optionally may contain a desuperheater coil 56 which heats the contents of the tank 92 by extracting heat from the refrigerant discharged by air-conditioning compressor 60. In contrast to the tank 42 of FIG. 1, which must be resistant to the corrosive effects of fresh, oxygenated water, the tank 92 may be constructed of a less corrosion-resistant material since it is not exposed to fresh water. In addition, since the stored water is not at an elevated pressure, the tank 92 may be of a lighter construction than the tank 42 which is required to withstand the elevated pressure of the domestic water. Since the domestic hot water flowing through immersion coil 98 must be heated upon demand, the storage temperature of the tank 92 is of necessity higher than that of the tank 42. For equal insulation, this will result in higher heat losses. Also, in view of the higher storage temperature, the water heating efficiency of the system shown in FIG. 2 will be generally lower than that of FIG. 1.

Figure 3:
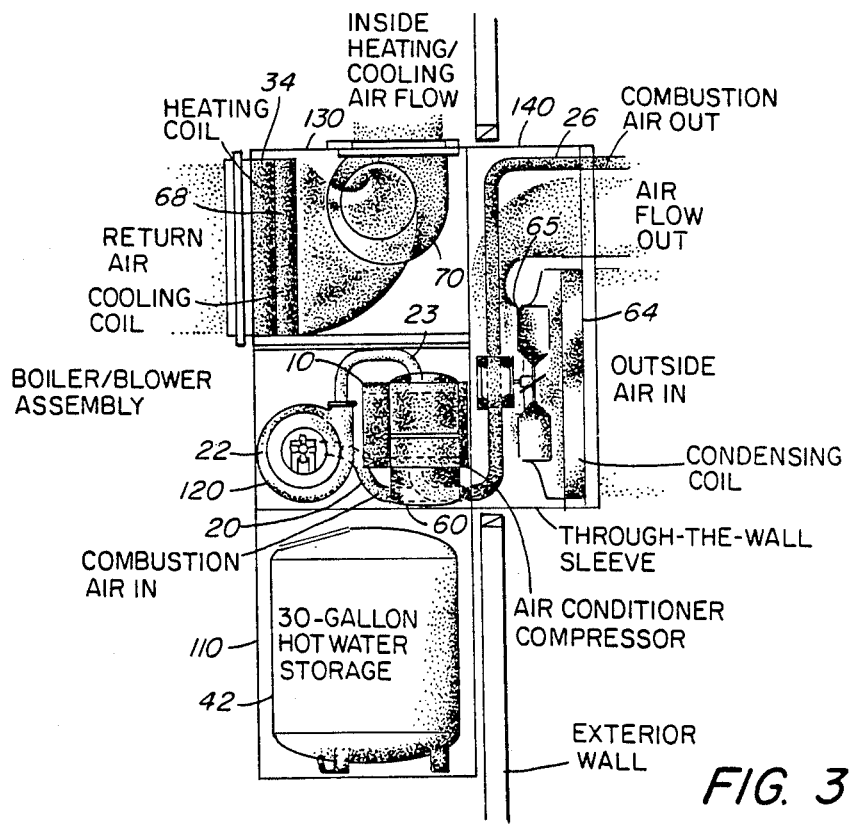
FIG. 3 is a side view, with the housing broken away, of an appliance embodying the present invention.

The preferred arrangement of components is illustrated in FIG. 3. The components are packaged in a single housing containing a lower section 110, a middle section 120, an upper section 130, and an exterior section 140. The lower section contains hot water storage tank 42. The middle section contains the boiler 10 and the combustion blower 22, the air-conditioning compressor 60, along with controls, secondary components such as the accumulator 71 and dryer 72, and associated piping and ducting, including the combustion air intake duct 20 and the blower/burner connecting duct 23. The upper section 130 contains the air heating coil 34, air-conditioning evaporator coil 68, heating/cooling blower 70, and other secondary components. The outer section 140 contains the air-conditioning condenser 64, condenser fan 65, and burner exhaust duct 26, along with the entrance to intake duct 20 (not shown). The arrangement of FIG. 3 is particularly well-suited to installation in a restricted space, as the vertical arrangement of components requires minimum floor space, provides good access for servicing components, and requires a minimum of site fabrication. In placing the system against an exterior wall such that the exterior section 140 penetrates through the wall, access to the outside environment is gained for combustion intake and exhaust and condenser cooling without the necessity of site fabrication of burner intake or exhaust ducting or piping to interconnect the air-conditioning condenser with the remainder of the system. Such efficiency of packaging and ease of installation are important benefits in comparison to other systems.

With the arrangement as shown in FIG. 3, the heaviest component, the storage tank, is positioned at the base of the housing. Heavy operating components are positioned in the next higher section 120. Those components are also the most likely to require servicing and they are positioned at a most convenient height. The air handling sections, which include large voids for the passage of air and are thus less heavy and require less maintenance, are positioned in the upper and exterior sections.

Figure 4:
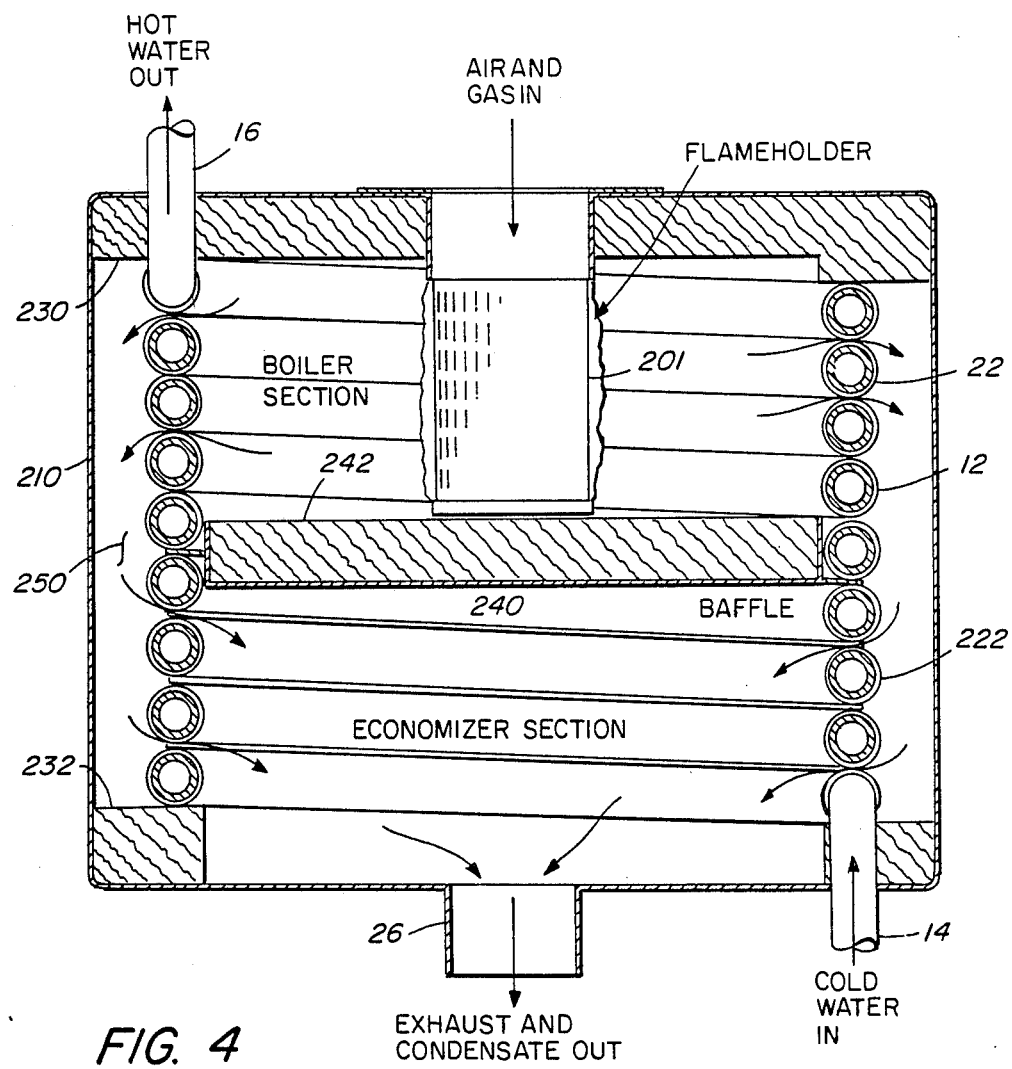
FIG. 4 is a cross sectional view of a burner and burner heat exchanger in the appliance of FIGS. 1 and 3.

A preferred arrangement of components comprising the boiler 10 is shown in FIG. 4. The fluid heating coil 12 comprises finned tubing, preferably of corrosion-resistant material, such as 304L stainless steel, 316L stainless steel, or 29-4C stainless steel. The tubing is wound in a helical coil, such that the fin tips of adjacent turns are touching. The coil 12 has a cold fluid inlet 14 at one end, and a hot fluid outlet 16 at the opposite end. It is contained within a housing 210 which is constructed of heat and corrosion-resistant material. A burner 201 is mounted in an upper opening of the housing 210 to receive air and gas mixture from the combustion blower 22 (not shown in FIG. 4). Burner 201 preferably consists of a perforated sheetmetal flameholder. The coil 12 is separated into an upper boiler section 220 and a lower economizer section 222 by baffle 240 which is insulated from hot combustion products of the boiler section by refractory insulation 242. The top end of the boiler section 220 is enclosed by the upper refractory insulation cap 230. The lower end of economizer section 222 is closed by lower insulating baffle 232. In operation, air and gas supplied by combustion blower 22 enter burner flameholder 201 and burn in the space between flameholder 201 and boiler section 220. The hot products of combustion flow in between the fins of the boiler section 220 into a plenum 250 which directs the gases to the economizer section 222. The gases flow between the fins of the economizer section 222 to exhaust outlet 26 which discharges the cooled gases and condensate.

This boiler design forms a reasonably compact and relatively easy to manufacture assembly, since the boiler coil may be wound in one pass on a mandrel. Jacket losses from the intermediate plenum 250 are moderate since the exhaust product temperature is on the order of 200°-300° F. at this point. By causing the products of combustion to make two passes over the fluid heating coil, higher efficiency is obtained than if only a single pass were made, and if the fluid inlet temperature at inlet 14 is sufficiently low, below 130° F., the flue gases may be cooled below their dew point by the economizer 222.

Figure 5:
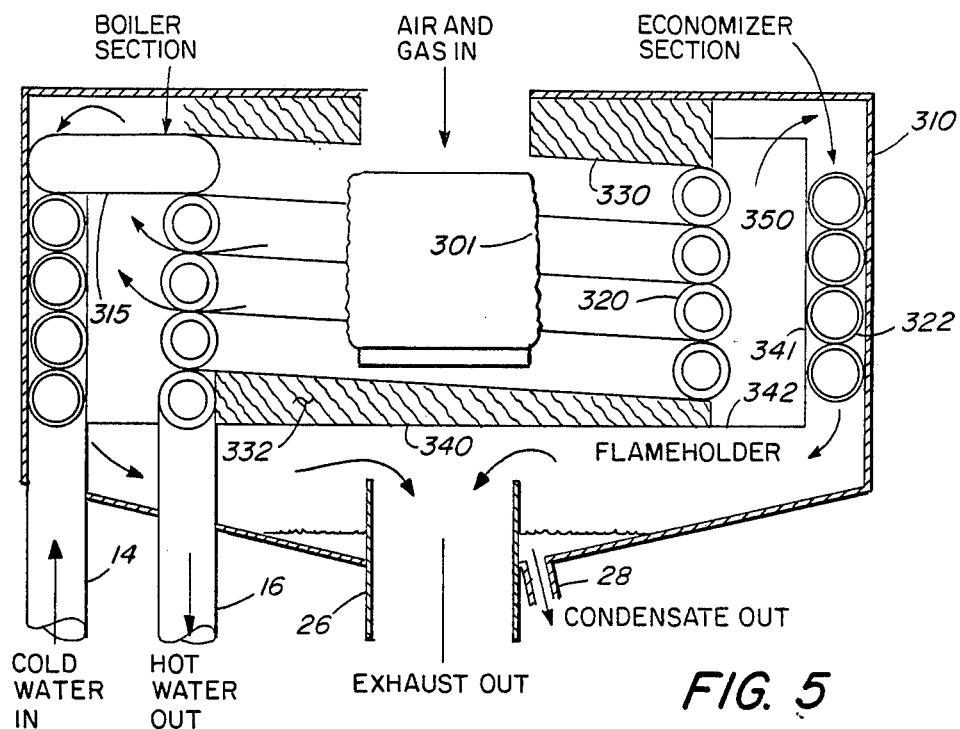
FIG. 5 is a cross sectional view of an alternative burner heat exchanger configuration which allows for radial flow through a primary heat exchanger section and axial flow through an economizer section.

An alternate boiler arrangement is shown in FIG. 5. A housing 310 contains a burner 201, a boiler section 320, and an economizer section 322. The boiler section 320 is separated from the economizer section 322 by a sheetmetal baffle 340 which consists of a cylinder 341 joined to a bottom pan 342. The bottom pan 342 is insulated from the hot products of combustion by refractory insulation 332. Likewise the top surface of the housing 310 is insulated by the refractory insulation cap 330. The economizer 322 is connected to the fluid inlet 14, and is joined to the inlet of the boiler 320 by a fluid conduit 315. The boiler 320 is connected to fluid outlet 16. In operation, air and gas are forced through the blower 301 by combustion air blower 22 (not shown in FIG. 5), and burn on the downstream side of flameholder 201. The hot products of combustion flow over the coil 320, through the intermediate plenum 350, and are turned by the baffle 340 to flow axially over the economizer section 322 and thence to exhaust 26. Any condensate collecting in the bottom of housing 310 may be removed through the condensate outlet 28.

In comparison to the boiler arrangement of FIG. 4, the arrangement of FIG. 5 achieves higher heat transfer for a given amount of tubing as a result of the higher gas velocities achieved in the economizer section 322 by virtue of the axial gas flow instead of radial gas flow. The overall height of housing 310 may be smaller than that of housing 210 of FIG. 4, while the diameter may be greater.

Figure 6:
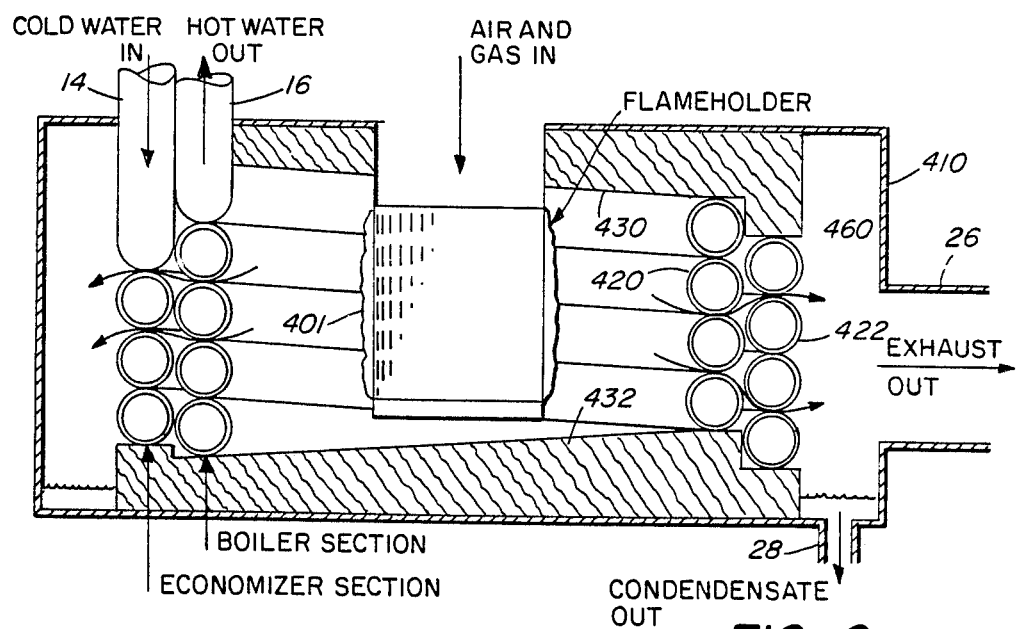
FIG. 6 is a cross sectional view of yet another configuration of burner heat exchanger including helically wound concentric heat exchanger sections.

Another alternative is shown in FIG. 6. A housing 410 contains burner flameholder 401 and a helically-wound boiler section 422. The bottom surface of the combustion chamber formed by boiler 420 and burner 401 is insulated by a refractory insulation cap 432, and the upper surface by a refractory cap 430. Hot combustion products flow radially first over the boiler section 420, and then over the economizer section 422 into exhaust plenum 460 from which they are conveyed out by exhaust outlet 26. Condensate is removed from the chamber by the condensate outlet 28. The economizer coil 422 may be wound directly over the boiler coil 420 such that the hand of the coil 420 is opposite that of 422. In this case, the relationship between the individual coils of the boiler 420 and economizer 422 will vary circumferentially between in-line and staggered. Alternately, the boiler coil 420 may be helically wound in a like hand to the economizer coil 422, in which case the individual coils of the boiler section 420 may be staggered with respect to the coils of the economizer 422. The latter arrangement generally provides more effective heat transfer, while being more difficult to coil, generally requiring two separate coils to be wound. The former arrangement of FIG. 6 may be continuously wound on a mandrel, but will provide less effective heat transfer and poorer gas flow distribution.

A further alternative is shown in FIG. 7. This arrangement is similar to that of FIG. 6, except that the boiler coil 520 and economizer coil 522 are wound from a single length of tubing with end turns so arranged that the crossover between the boiler section 520 and economizer section 522 lies in a horizontal plane. This greatly simplifies the construction of the bottom insulating cap 532, since it may now have a planar upper surface as opposed to the helical surface required by the arrangement of FIG. 6.

Figure 7A:
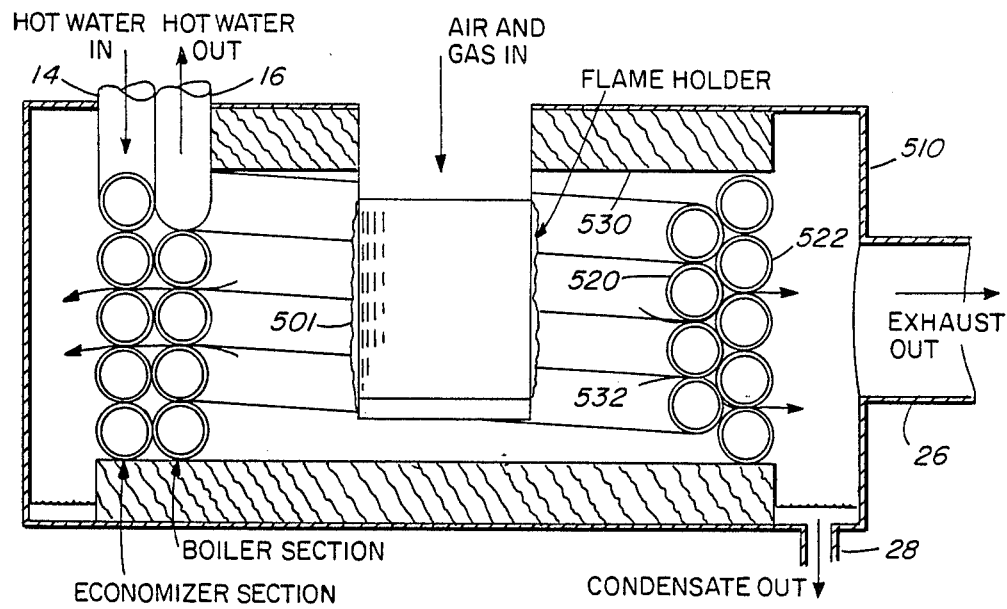

This system can best be visualized by considering winding of the heat exchanger tubing from the hot water outlet 16 in a clockwise direction as viewed from the top of FIG. 7a. The last turn of the inner heat exchanger section is completed at 534 against the end cap 532. The tube is then formed with an increasing radius along the surface of the end cap as it moves out to the beginning of the first turn of the outer heat exchanger section at 536. Increasing radius is required to keep the transition length just outside of the inner turn 538 while keeping the transition in the plane of the end cap 532. From 536 the outer section can then be helically wound about the inner section in a reverse axial direction. At the upper end of the heat exchanger adjacent to the end cap 530, the last turn of the outer heat exchanger section must follow a path of increasing radius to pass around the previous turn of the outer section yet remain in the plane of the end cap. The result of the transition length of increasing radius is a bulge at each end of the heat exchanger assembly illustrated in the perspective view of FIG. 7b.

Figure 8:
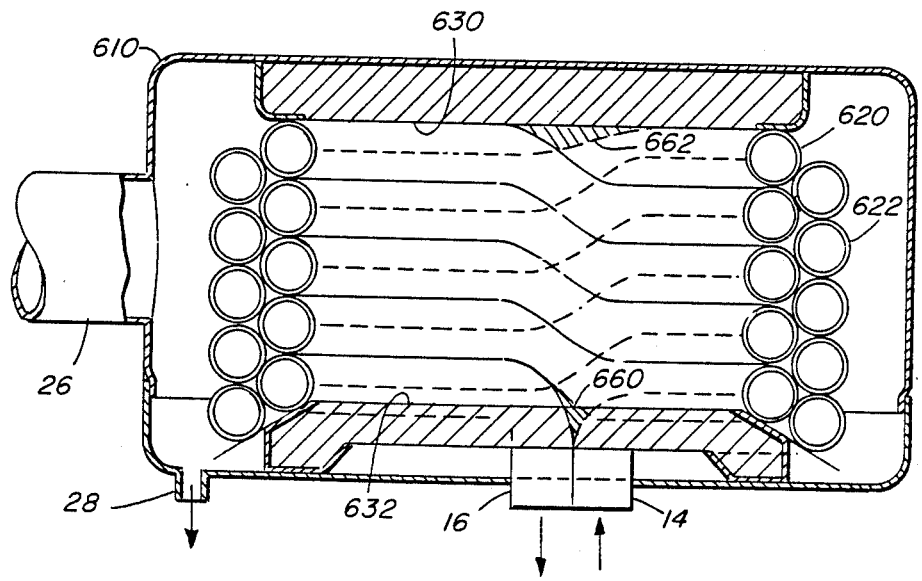
FIG. 8 is a cross sectional view of still another burner heat exchanger configuration in which the turns of the heat exchanger coil are laid in parallel planes.

The requirement for helical sealing surfaces is also avoided by the arrangement of FIG. 8, in which boiler coil 620 and an economizer coil 622 are wound in parallel planes, instead of in continuous helices. A transition length of tubing such as at 623 is provided between successive planar turns of the tubing to provide the axial displacement of successive turns equal to the tubing diameter. The transition 625 is provided adjacent to the end cap 630 between the inner heat exchanger section and the outer section. That transition provides for a radial displacement equal to the diameter of the tubing and an axial displacement equal to half the diameter. By this arrangement, the individual coils of the economizer 622 may bear a staggered relationship to the coils of the boiler 620, thereby achieving the most effective heat transfer, while the sealing surfaces of the refractory caps 632 and 630 need not be helical surfaces. The crossover portions 660 and 662 between coils lying in adjacent planes may be baffled or otherwise sealed off to prevent excessive flow of hot combustion products through the gaps between adjacent coils.

Each of the above boiler arrangements utilizes a single length of tubing to form both the boiler and the economizer coils. Thus, they provide the high efficiency of an economizer without unduly adding to the cost of the system. By forming both sections of the same non-corrosive stainless steel, it is not so critical that condensation be limited to the economizer section. Therefore, the system design is less critical.

While this invention has been particularly shown and described with references to preferred embodiments thereof, it will be understood by those skilled in the art that various changes in form and details may be made therein without departing from the spirit and scope of the invention as defined by the appended claims.

We claim:

1. An integrated water heating and space heating and cooling appliance comprising:
   a housing having a lower water storage section, a middle hardware section, and an upper internal air handling section in an internal portion, and having a side external air handling section extending from the internal portion to pass through a building wall;
   an insulated hot water storage tank in the lower section of the housing;
   a burner and burner heat exchanger in the middle section for heating a heating medium;
   a liquid to air heat exchanger in the upper section;
   a heat transfer fluid circuit means for selectively directing heating medium from the burner heat exchanger in the middle section into heat exchange relationship with hot water in the hot water storage tank in the lower section to heat potable hot water or to the liquid to air heat exchanger in the upper section to heat hot air and for returning the heating medium to the burner heat exchanger;
   an air conditioner compressor in the middle section;
   an air conditioner evaporator in the upper section adjacent to and in face to face relationship with the liquid to air heat exchanger;
   a blower in the upper section for blowing space conditioning air past the liquid to air heat exchanger and the evaporator for heating the air by the heat exchanger or cooling the air by the evaporator;
   an air conditioner condenser in the side section, said evaporator, compressor and condenser being connected by conduit means to form a refrigeration system, and
   a blower in the side section for blowing external air past the condenser.

2. An appliance as claimed in claim 1 further comprising flow control means for varying the flow of heating medium through the burner heat exchanger to maintain a steady temperature of heating medium from the burner heat exchanger flowing to either the liquid to air heat exchanger or the storage tank.

3. An appliance as claimed in claim 2 wherein the flow control means maintains a low return temperature to the burner heat exchanger from both the liquid to air heat exchanger and the hot water storage tank for condensation of the products of combustion from the burner during a substantial portion of each heating cycle.

4. An appliance as claimed in claim 2 wherein the flow rate of heating medium to the storage tank during a hot water heating cycle increases to a level greater than the flow rate of heating medium to the liquid to air heat exchanger during a hot air heating cycle.

5. An appliance as claimed in claim 2 wherein the heating medium from the burner heat exchanger is controlled to a temperature of about 180° F.

6. An appliance as claimed in claim 5 wherein the return temperature of the heating medium from the liquid to air heat exchanger to the burner heat exchanger is about 110° F.

7. An appliance as claimed in claim 1 further comprising means for passing refrigerant from the air conditioner compressor into heat exchange relationship with the water in the storage tank to heat the water.

8. An appliance as claimed in claim 1 wherein the burner heat exchanger comprises a single tube forming a primary heat exchanger section and an economizer heat exchanger section.

9. An appliance as claimed in claim 1 wherein the burner heat exchanger is formed of a single tube wound in one axial direction to form an inner heat exchanger section, along a transition to an outer heat exchanger section and in a reverse axial direction to form the outer heat exchanger section, the transition being formed with a varying radius in a single plane of an end cap from the final turn of the inner heat exchanger section to the first turn of the outer heat exchanger section such that the transition and said first and final turns together form a complete turn of tubing lying in the single plane of the end cap.

10. An appliance as claimed in claim 1 wherein the burner heat exchanger is formed of a single tube formed into inner and outer heat exchanger sections, each section formed of axially spaced planar turns with a transition between each turn providing an axial displacement of successive turns and a transition between inner and outer sections providing an axial and radial displacement between the sections such that the turns of the outer section are in parallel planes staggered relative to parallel planes of turns of the inner section.

11. An appliance as claimed in claim 1 wherein the burner heat exchanger comprises a helical tube and a baffle within an annular spaced defined by the tube to form primary and secondary heat exchanger sections, with the burner within the coil in the primary heat exchanger section such that products of combustion flow radially outward from the burner through the primary section of coil and then radially inward through the secondary section of the coil.

12. An integrated water heating and space heating and cooling appliance comprising:
   a housing having a lower water storage section, a middle burner section, and an upper internal air handling section in an internal portion, and having a side external air handling section extending from the internal portion to pass through a building wall;
   an insulated hot water storage tank in the lower section of the housing;
   a burner and burner heat exchanger in the middle section for heating a liquid heating medium;
   a liquid to air heat exchanger in the upper section;
   a heat transfer fluid circuit means for selectively directing heating medium from the burner heat exchanger in the middle section into heat exchange relationship with hot water in the hot water storage tank in the lower section to heat potable hot water or to the liquid to air heat exchanger in the upper section to heat hot air and for returning the heating medium to the burner heat exchanger;
   an air conditioner evaporator in the upper section adjacent to and in face to face relationship with the liquid to air heat exchanger;
   a blower in the upper section for blowing space conditioning air past the liquid to air heat exchanger and the evaporator for heating the air by the heat exchanger or cooling the air by the evaporator;
   an air conditioner condenser in the side section;
   a compressor operatively connected by conduit means to said compressor and evaporator to form a refrigeration system; and
   a blower in the side section for blowing external air past the condenser.

13. An appliance as claimed in claim 12 further comprising flow control means for varying the flow of heating medium through the burner heat exchanger to maintain a steady temperature of heating medium from the burner heat exchanger flowing to either the liquid to air heat exchanger or the storage tank.

14. An appliance as claimed in claim 13 wherein the flow control means maintains a low return temperature to the burner heat exchanger from both the liquid to air heat exchanger and the hot water storage tank for condensation of the products of combustion from the burner during a substantial portion of each heating cycle.

15. An appliance as claimed in claim 13 wherein the flow rate of heating medium to the storage tank during a hot water heating cycle increases to a level treater than the flow rate of heating medium to the liquid to air heat exchanger during a hot air heating cycle.

16. An appliance as claimed in claim 12 wherein the burner heat exchanger comprises a helical tube and a baffle within an annular spaced defined by the tube to form primary and secondary heat exchanger sections, with the burner with the coil in the primary heat exchanger section such that products of combustion flow radially outward from the burner through the primary section of coil and then radially inward through the secondary section of the coil.

17. An appliance as claimed in claim 12 wherein the heat transfer fluid circuit means comprises a common pump in a central section for pumping heating medium to the hot water storage tank or to the liquid to air heat exchanger.

* * * * *